US005101219A

United States Patent [19]

Gerber et al.

[11] Patent Number: 5,101,219

[45] Date of Patent: Mar. 31, 1992

[54] LONG LIFE PEN AND INK SUPPLY UNIT FOR X,Y PLOTTER AND THE LIKE AND RELATED METHOD OF USE

[75] Inventors: Heinz J. Gerber, West Hartford; Andrew G. Bakoledis, Clinton, both of Conn.

[73] Assignee: Gerber Garment Technology, Inc., Tolland, Conn.

[21] Appl. No.: 508,798

[22] Filed: Apr. 12, 1990

[51] Int. Cl.[5] .................... G01D 15/16; B43L 13/00

[52] U.S. Cl. .................... 346/1.1; 346/140 A; 346/140 R; 346/139 R; 33/18.1

[58] Field of Search ............ 346/139 C, 139 R, 1.1, 346/140 R, 140 A; 33/1 M, 18.1; 73/304 R, 323; 116/227

[56] References Cited

U.S. PATENT DOCUMENTS

| | | | |
|---|---|---|---|
| 3,054,109 | 9/1962 | Brown | 346/117 |
| 3,341,860 | 9/1967 | Schweitzer | 346/140 R |
| 4,054,883 | 10/1977 | Ozone | 346/140 R |
| 4,325,072 | 4/1982 | Rosel | 346/140 R |
| 4,392,147 | 7/1983 | Rosel | 346/140 R |
| 4,426,783 | 1/1984 | Gerber et al. | 346/139 C |
| 4,736,211 | 4/1988 | Sieber et al. | 346/139 R |
| 4,756,086 | 7/1988 | Yajima et al. | 346/140 R |
| 4,916,819 | 4/1990 | Gerber | 33/18.1 |
| 4,929,109 | 5/1990 | Ikenga | 346/140 R |
| 4,933,876 | 6/1990 | Markoff et al. | 346/139 R |
| 4,937,594 | 6/1990 | Niemeyer | 346/140 R |
| 5,005,296 | 4/1991 | Gerber | 33/18.1 |

FOREIGN PATENT DOCUMENTS 0738745 10/1955 United Kingdom .

*Primary Examiner*—Benjamin R. Fuller
*Assistant Examiner*—Alrick Bobb
*Attorney, Agent, or Firm*—McCormick, Paulding & Huber

[57] ABSTRACT

In a plotter or other device for drawing inked lines on a receiving surface, an ink reservoir holding a large quantity of ink is provided to attain a long operational life for the associated pen. The reservoir includes a piston or other moveable working member to which air pressure is applied for pressurizing the ink, and the ink reservoir and associated pen are permanently connected with one another and with a few ancillary parts to provide a unit assembly readily connected to and disconnected from a pen head to permit quick exchange of units without danger of ink spillage. The ink reservoir is transparent or translucent to give the operator a visual indication of when the unit assembly is in need of replacement because of imminent ink exhaustion, and sensor may also be provided for automatically producing an electrical "out of ink" signal which appears upon the complete exhaustion of ink from the unit.

25 Claims, 7 Drawing Sheets

LONG LIFE PEN AND INK SUPPLY UNIT FOR X,Y PLOTTER AND THE LIKE AND RELATED METHOD OF USE

BACKGROUND OF THE INVENTION

The present invention relates to devices, such as X,Y plotters, for drawing lines on a receiving surface, as provided for example by a sheet of paper, and deals more particularly with a pen and ink supply unit for use with such a device which unit is expendable, is easily attached to and removed from the drawing device to allow the quick replacement of one unit by another one, and which unit contains a large supply of ink to give it a long service life.

Plotters and other line drawing devices using pens, such as ball point pens or capillary tube pens, for applying ink to receiving surfaces have the requirement that the pen be given an adequate supply of ink during a line drawing process to assure the production of high quality gap free lines. For operation of the devices at high drawing speeds, this usually demands that the ink supplied to the pen be pressureized.

Various attempts have been made in the past to deal with the supplying of ink under pressure to a pen of the aforegoing character. One presently used method is to supply each pen in a form including a pen tube containing a quantity of ink and combined with a small capsule of pressurized air or other gas which pressurizes the ink in the tube during the life of the pen. A disadvantage of this, however, is that each pen tube contains only a relatively small amount of ink, giving the pen a relatively short life and therefore requiring frequent stoppage of the line drawing device for pen replacement. Further, unless watched carefully, devices using such pens often continue to operate long after the pen runs out of ink, therefore requiring a troublesome restart and redoing of some work after the empty pen has been replaced by a new one.

Another known method of supplying pressurized ink to a pen is to provide a separate refillable ink reservoir capable of holding a large quantity of ink and to which a quantity of pressurized air or other gas overlying the ink in the reservoir is applied. Disadvantages of this method are that the refilling of the reservoir requires the direct handling of ink which, unless done very carefully, can lead to spillage and very messy conditions. Also, it is difficult in this method to change to a different type or color of ink and to change pens as may be desired to draw with different types or colors of inks or to create lines of different width.

The general object of this invention is therefore to provide a pen and ink supply unit for use with a plotter or similar line drawing device which overcomes the aforementioned problems of known ink supply methods and which has other advantageous features. More particularly, the pen and ink supply unit of the present invention is one wherein a pen and ink reservoir are combined as a unit assembly which is readily attachable to and removeable from the line drawing device to permit quick replacement of an out of ink unit with a new unit or to permit quick exchange of units to change the color or type of ink or the width of line drawn. The unit further contains a large quantity of ink allowing the line drawing device after receiving a new unit to run for a very long item before the ink becomes depleted and the unit in need of replacement.

Further, the pen and ink supply units of the invention are prefilled with ink, are nonrefillable, and are of such low cost that they may be thrown away when empty, avoiding the need for the device operator to directly handle ink and thereby avoiding the likelihood of ink spillage.

A further object of the invention is to provide a pen and ink supply unit of the aforegoing character whereby to eliminate or minimize the possibility of ink leakage, the units may be shipped and stored in non-pressurized condition, with the ink in the supply reservoir of each unit not being pressurized until immediately before or after the unit is attached to the pen head of a plotter.

Other objects and advantages of the invention will be apparent from the following description of detailed embodiments of the invention and from the accompanying drawings and claims.

SUMMARY OF THE INVENTION

This invention relates to an ink reservoir for use with a plotter or similar line drawing device wherein the reservoir has a chamber with ink discharge and air inlet ends and receives a moveable working member, such as a piston axially slidable therein, sealingly separating the ink discharge end from the air inlet end to divide the chamber into an ink receiving portion and an air receiving portion, so that by applying pressurized air to the air receiving portion of the chamber through the air inlet end the working member is urged toward the ink discharge end to pressurize the ink in the ink receiving portion and as supplied to the associated pen through the ink discharge end.

The invention further resides in the pen and the ink reservoir being combined with one another and with various ancillary parts to form a unit assembly which is readily connected to and disconnected from the pen head of a line drawing device to permit quick replacement of units when the ink of the currently used unit reachs a nearly or fully exhaused state or to exchange units for other purposes such as to draw with a different color or type of ink or to change the width of the drawn lines.

The invention also resides in the ink reservoir being transparent or translucent and so arranged on a pen head when connected therewith that the ink in the ink receiving portion of the chamber is visible to an operator from outside of the pen head to allow the operator to accurately judge when the reservoir is in need of replacement; and also resides in the moveable working member being a piston and in the reservoir having a means enabling the pressurized air to flow around the piston when the piston reaches the ink discharge end of the chamber to continue to apply pressure to the ink until the ink is completely exhausted from the pen, in combination with a sensor for sensing a drop in air pressure due to leakage of air from the empty pen to provide an "out of ink" signal which may be used to automatically inhibit further line drawing operation of the associated device.

The invention further resides in the method for using a pen and ink reservoir unit of the aforegoing character wherein the ink in the reservoir is prepressurized, either by applying a precharge of pressurized air to the air receiving portion of the chamber or by the action of a spring in the air receiving portion of the chamber urging the piston or other moveable working member toward the ink discharge end to enable immediate operation of the pen upon the unit being connected to a line drawing device.

The invention still further resides in other features and method steps defined in detail in the appended claims.

BRIEF DESCRIPTION OF THE DRAWINGS

FFIG. 1 is a perspective view of a plotter embodying the invention with portions of it being broken away to reveal further details.

DETAILED DESCRIPTION OF THE PREFERRED EMBODIMENTS

Figure 1:
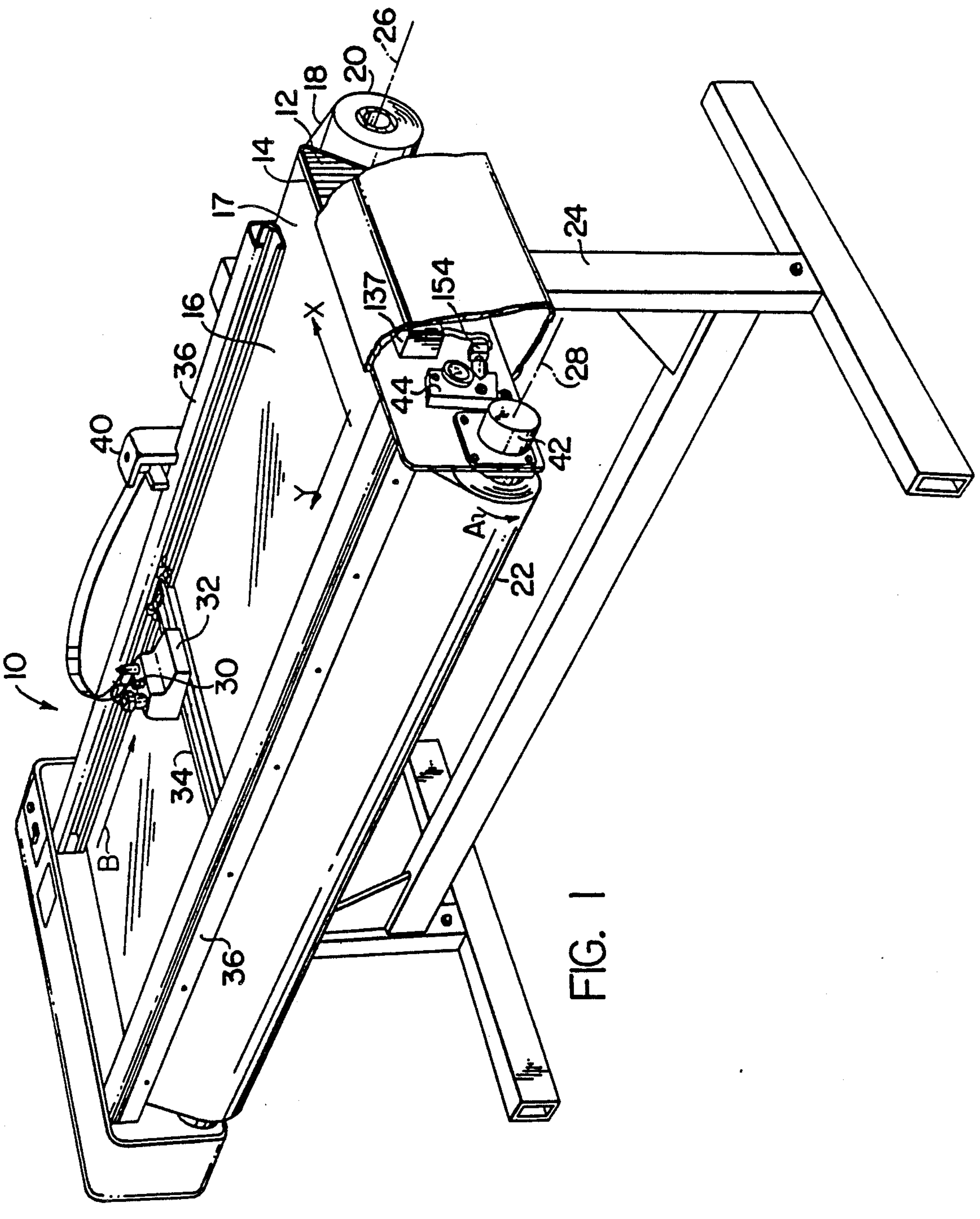
Figure 2:
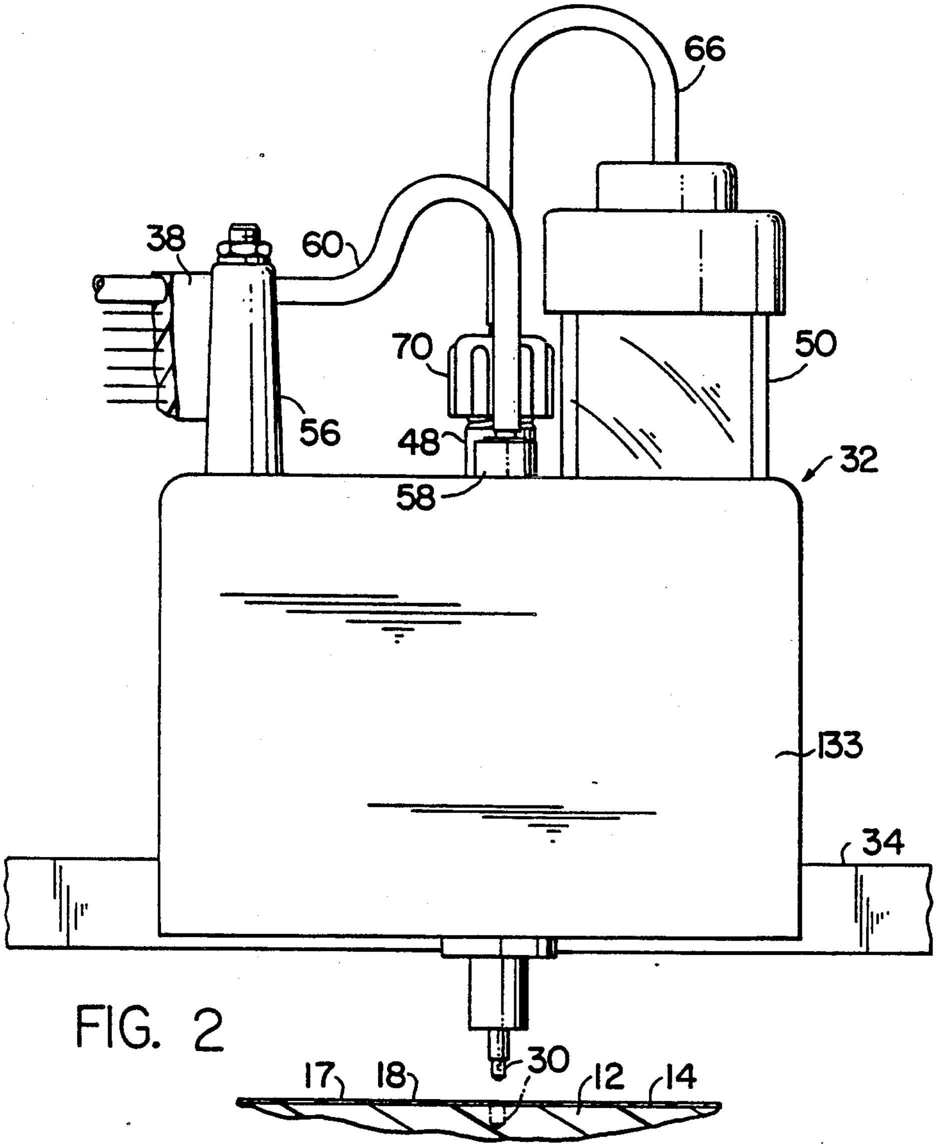
FIG. 2 is a fragmentary elevational view of the pen head of FIG. 1 looking generally in the direction of the arrow B of FIG. 1.
Figure 3:
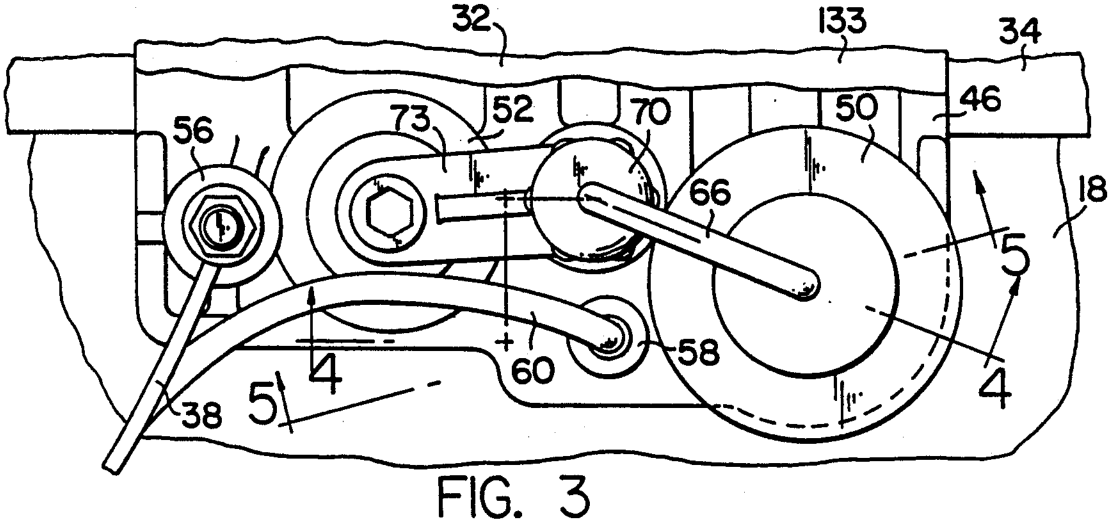
FIG. 3 is a fragmentary plan view of the pen head of FIG. 2 with the pen head cover removed.

The present invention has utility with regard to a wide variety of devices in which a pen is used to draw lines on a receiving surface. For the present description, such a device is taken to be an X,Y plotter wherein a pen is moveable in two coordinate directions over a surface supporting a sheet of paper providing the receiving surface. Such a plotter embodying the invention is shown in FIG. 1 and indicated generally at 10. Except for the pen head and the pen and ink reservoir unit assembly used with the pen head, the plotter 10 is taken to be the same as that shown by pending U.S. patent application Ser. No. 07/407,958 filed on Sept. 15, 1989, now U.S. Pat. No. 5,005,296, issued Apr. 9, 1991, by the same inventor as that of this application and entitled PLOTTER AND INK PRESSURIZING PUMP; and except for the pump and related parts for supplying pressurized air to a reservoir for the ink used by the plotter's pen, the plotter of said application is taken to be the same as that shown by pending U.S. patent application Ser. No. 07/195,128 filed on May 17, 1988, now U.S. Pat. No. 4,916,819, issued Apr. 17, 1990 by the same inventor as that of this application and entitled PROGRESSIVE PLOTTER WITH UNIDIRECTIONAL PAPER MOVEMENT. Reference may be had to said applications for further details of the plotter, if desired.

For the present it is sufficient to note that the plotter 10 has a table 12 providing an upwardly facing horizontal support surface 14 for supporting a portion 16 of a web of paper 18 providing an upwardly facing receiving surface 17 onto which lines are to be drawn by a pen to create graphics such as, for example, a marker used in the garment industry to show the shape and arrangement of pattern pieces to be cut from a layup of cloth sheets. The paper 18 is supplied from a supply roll 20 and is wound onto a take-up roll 22, with both of the rolls 20 and 22 being suitably supported for rotation relative to the frame 24 of the plotter about axes 26 and 28, respectively.

The plotter 10 operates to draw graphics on the receiving surface 17 of the portion 16 of the paper supported by the support surface 14 by means of a pen 30 forming part of a pen head 32 moveable in the illustrated X and Y coordinate directions, the pen head being moveable in the X coordinate direction relative to a carriage 34 extending in the X direction and moveable in the Y direction along the length of two side rails 36,36 extending in the Y direction at opposite sides of the table 12. Electrical power, electrical signals and pressurizing air for pressurizing the ink used by the pen 30 are communicated between the pen head 32 and the remainder of the plotter by a flexible wand 38 having one end pivotally connected to the pen head 32 and at its other end pivotally connected to a fitting 40 fixed to one of the rails 36 as shown.

The paper 18 in going from the supply roll 20 to the take-up roll 22 passes over the support surface 14. Advancement of the paper over the surface 14, to bring fresh portions of the paper to the surface 14 is obtained by operation of a drive motor 42 which rotates the take-up roll 22 in the direction of the arrow A of FIG. 1 to wind paper onto the roll 22. The advancement of the paper over the surface 14 may be coordinated with the drawing operation of the pen head in various ways, but most commonly the pen head is operated to draw a portion of a graphic on the portion 16 of the paper then on the support surface 14, the paper is then advanced to bring a fresh portion to the surface 14, and then the drawing operation is again resumed to draw another portion of the graphic on the fresh portion of the paper, and these alternate drawing phases and advancement phases are continued until a complete graphic is generated.

The plotter 10 of FIG. 1 also includes an air pump 44 for supplying pressurized air to the pen head 32 to pressurize the ink used by the pen 30 in the manner hereinafter described in more detail. This pump 44 is adapted and arranged to be driven by the same motor 42 as drives the take-up roll 22. This means that the pump is driven intermittently in unison with the intermittent advancements of the paper 18.

Figure 4:
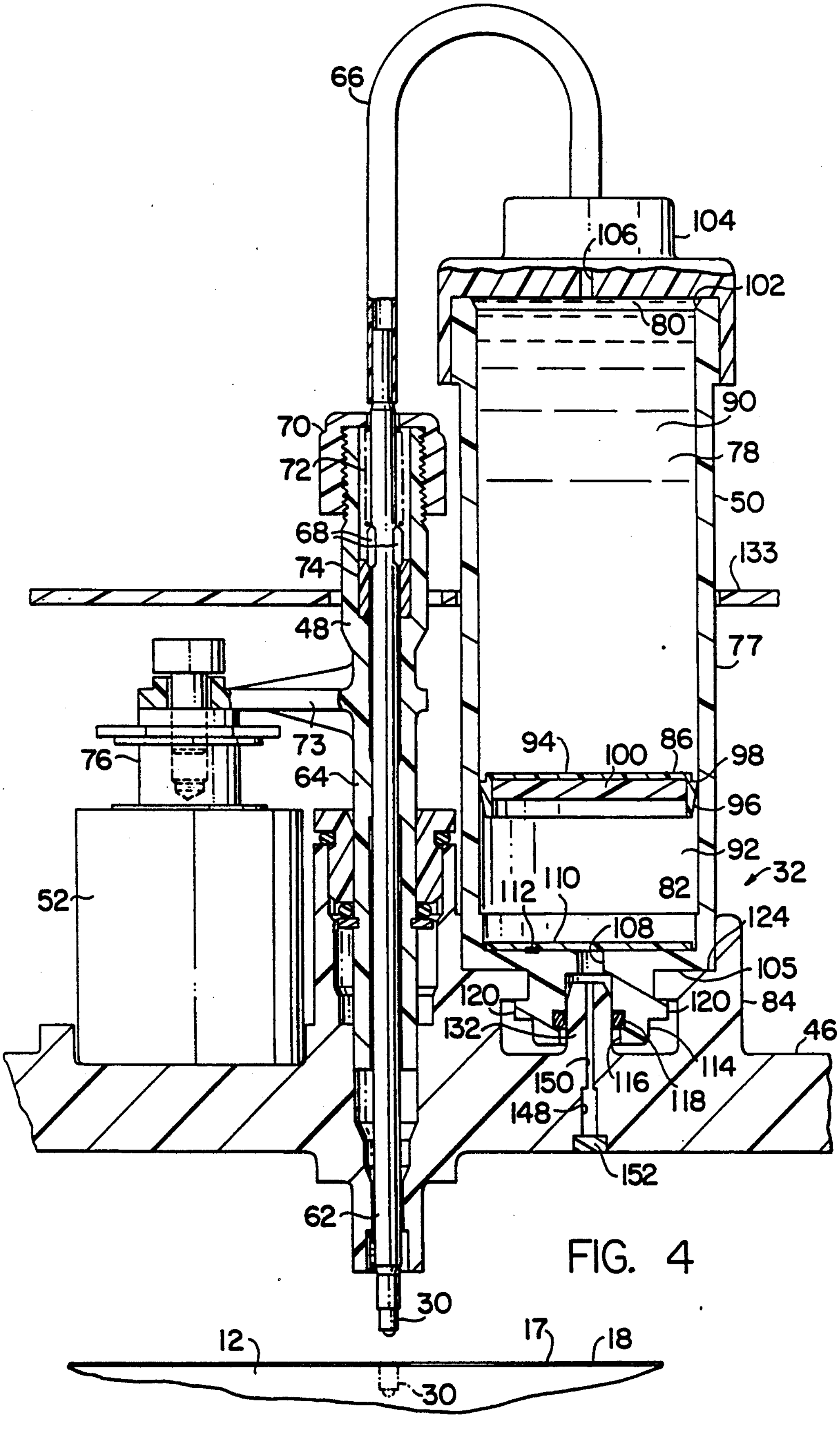
FIG. 4 is a vertical sectional view taken on the line 4—4 of FIG. 3.
Figure 5:
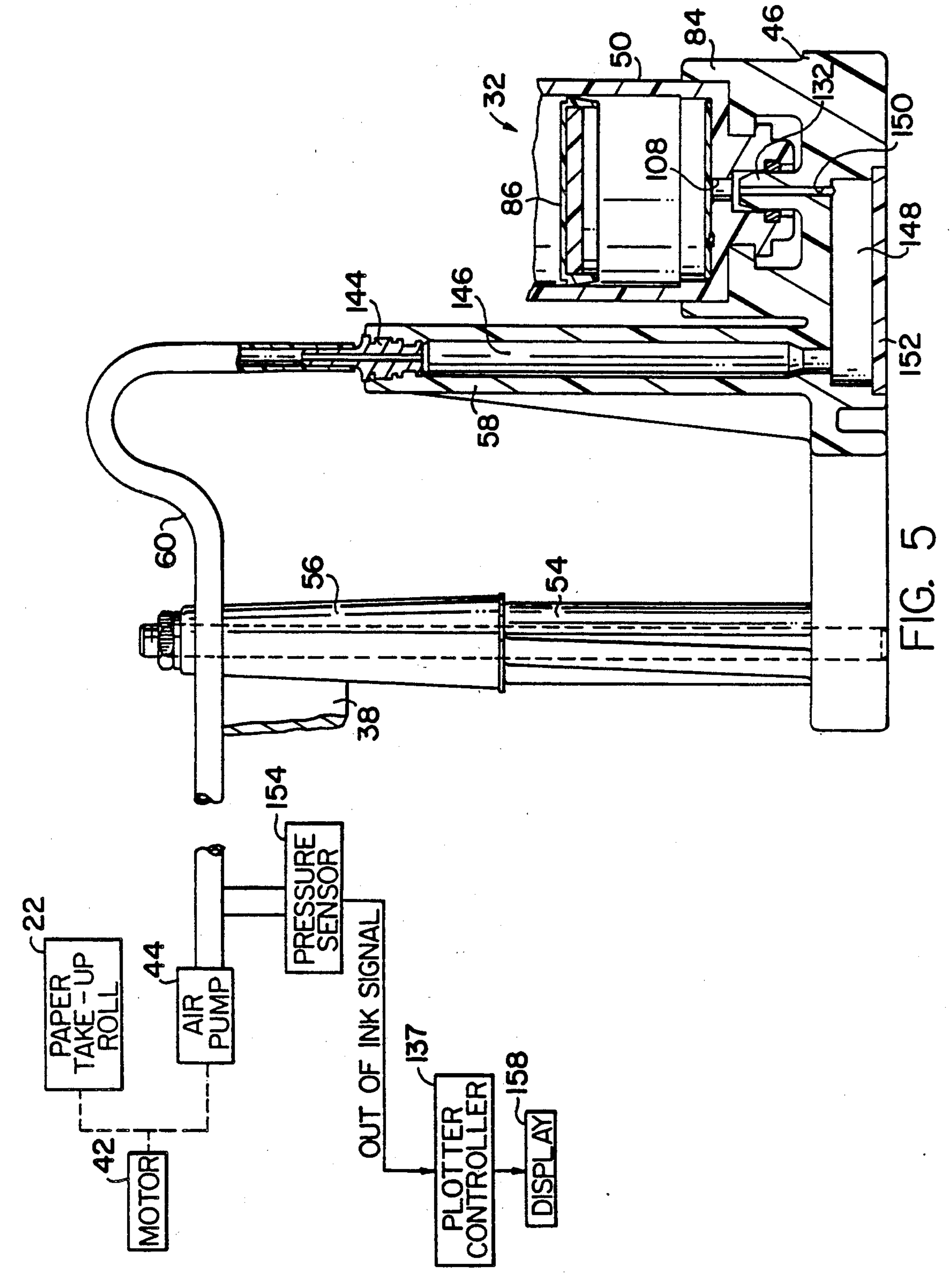
FIG. 5 is a vertical sectional view taken on the line 5—5 of FIG. 3.

Turning now to FIGS. 2 to 9, the pen head 32 includes a base 46,suitably supported for and driven in movement along the length of the carriage 34. As shown best in FIG. 4, the pen head base 46 carries a holder 48 for the pen 30, an ink reservoir 50 and an electro-mechanical solenoid 52; and as best shown in FIG. 5 the base also includes a vertically extending post 54. to the upper end of which the adjacent end 56 of the flexible wand is pivotally connected, anbd another upwardly extending tubular post 58 to which the pressurized air supply tube 60 of the wand 38 is connected.

The pen 30 may take various different forms without departing from the invention, and as shown in FIG. 4 consists of a pen tube 62, held in a vertical position by the pen holder 48, having a means at its lower end for transferring ink from the tube to the receiving surface 17. In the illustrated case the pen 30 is a ball point one with the ink transferring means being a ball rotatably captured in the lower end of the pen tube 62, but pens with other types of ink transferring means, such as capillary tubes, may also be used if desired. The pen holder 48 has a main tubular body 64 which slideably receives the pen tube 62. The upper end of the pen tube 62 is open, extends above the holder 48 and is connected to a supply tube 66 for supplying ink from the reservoir 50 to the pen. Between its ends the pen tube 62 is crimped to form two radially extending abutments 68. A cap 70 is releasably connected by threads to the upper end of the pen holder 48 and a helical compression spring 72 surrounding the pen tube 62 is compressed between the cap 70 and the upper ends of the abutments 68 to urge the pen tube downwardly relatively to the pen holder to the downwardly limited position shown in FIG. 4 at which the lower ends of the abutments 68 engage a metal sleeve 74 in the bore of the pen holder.

The pen holder 48 is supported for vertical sliding movement by the pen head base 46 with a radial arm 73 of the holder being connected to the plunger 76 of the solenoid 52 for moving the pen holder between a raised nondrawing position and a lowered drawing position. In FIG. 4 the solid lines show the pen holder 48 and pen 30 in their raised nondrawing positions. From these raised positions the pen holder is moved downwardly by downward movement of the solenoid plunger 76 until reaching the downwardly limited drawing position of the pen holder. If the table 12 were not present to limit the downward movement of the pen 30 the pen would reach the position shown by the broken lines of FIG. 4 when the pen holder reaches its fully lowered position. However, as the pen holder moves downwardly the lower end of the pen 30 engages the paper 18 on the table 12 before the pen holder reaches its lowermost position. Thus, after the lower end of the pen engages the paper 18 further downward movement of the pen holder to its lowermost position is accompanied by downward sliding movement of the pen holder body relative to the pen, thereby compressing the spring 72 and applying a spring bias force to the pen holding it in resilient engagement with the paper 18.

The ink reservoir 50, as shown best in FIG. 4, consists of a main body 77 providing a chamber 78 having an ink discharge end 80 and an air inlet end 82. The reservoir is releasably connected with a holder 84 formed on the pen head base 46 and is held by the holder so that the axis of the chamber 78 is positioned vertically with the ink discharge end 80 being its upper end and the air inlet 82 being its lower end. Within the chamber 78 is a working member axially moveable relative to the body 77 and dividing the chamber 78 into an upper in receiving portion 88, filled with ink 90, and a lower air receiving portion 92. The working member may be an elastic membrane or may take various other forms. Preferably, and as illustrated, however, the chamber 78 is cylindrical and the working member is a cylindrical piston slibable axially in the chamber. The piston 86 is located in the lower end of the reservoir chamber 78 when the reservoir is completely filled with ink. During use of the pen pressurized air is supplied to the air receiving portion 92 of the chamber which urges the piston 86 upwardly to pressurize the ink 90 in the ink receiving portion 88 of the chamber, in the supply tube 66 and in the pen tube 62 to assure adequate transfer of ink from the pen to the receiving surface 17 during the drawing of lines.

As ink becomes used from the reservoir 50 the piston 86 moves upwardly to maintain the pressurization of the remaining ink. For this purpose the piston 86 and cylindrical chamber 78 are designed to maintain an airtight seal between the piston and chamber walls throughout substantially all of the piston's upward travel. However, preferably some means is provided so that when the piston reaches the upper or air discharge end 80 of the chamber air from the air receiving portion 92 of the chamber is permitted to flow around the piston to continue to apply pressure to the ink in the supply tube 66 and pen tube 62 until all of the ink is exhausted from the pen tube 62, and to cause the generation of an "out of ink" signal, as hereinafter described in more detail, when complete exhaustion of ink from the pen tube 62 occurs.

The design of the piston 86 and of the means for allowing air to flow past the piston when it reaches the ink discharge end of the cylindrical chamber may vary. In the illustrated case the piston 86, as shown in FIG. 4, is made as a cup-shaped molded plastic member having an upper circular wall 94 and an annular skirt 96 extending downward from the periphery of the wall 94. The skirt 96 has an outer surface of slightly conical shape with a portion of maximum diameter 98 located slightly below the upper wall 94. The inner surface of the skirt 96 is generally cylindrical and within the cavity formed by this surface and the upper wall 94 is a cylindrical plug 100 made of neoprene or similarly resilient material. The plug 100 is held in a somewhat compressed condition in the piston and therefore aids in urging the maximum diameter portion 98 of the skirt into good sealing engagement with the inner wall of the reservoir body. Further, at its upper end, the interior of the reservoir body is tapered as shown at 102 in FIG. 4, the taper being such that when the piston reaches the upper end of the cylindrical chamber the maximum diameter portion 98 of the piston skirt moves into the larger diametered portion of the chamber provided by the taper 102 and allows air to move past the piston and into the ink supply tube 66 and pen tube 62.

The upper or ink discharge end of the cylindrical chamber 78 is closed by a cap 104 permanently sealed to the reservoir body 77 as by sonic welding or adhesive, with the cap including an ink discharge opening 106 communicating with the ink supply tube 66. The lower or air inlet end of the chamber 78 is closed by an end wall 105 of the reservoir body having a centrally located air inlet opening 108.

Preferably, the ink reservoir is equipped with a one-way valve allowing pressurized air to be introduced to the air receiving portion 92 of the cylindrical chamber through the air inlet end thereof while preventing reverse movement of pressurized air from the air receiving portion. This permits, if desired, the application of a precharge of pressurized air to the air receiving chamber portion before the connection of the ink reservoir to the pen holder base. It also retains the pressurized air change in the reservoir in the event the reservoir is removed from the holder before the reservoir is empty of ink so that when the reservoir is returned to the pen head at a later time thee ink will still be pressurized and the pen ready for immediate use.

The one-way valve may take various different forms, and in the illustrated reservoir, as shown best in FIG. 4, consists of a circular disc 110 of flexible material, such as neoprene. This disc may be essentially free floating in the vicinity of the end wall 105 with some means being provided to retain it near to the end wall 105 when no pressurized air is in the air receiving portion 92 of the chamber. In the illustrated case, the disc is attached, as by adhesive, at one point 112 to the interior surface of the end wall 105 and otherwise loosely overlies the remaining portion of the wall 105 and inlet opening 108.

The ink reservoir 50 and the reservoir holder 84 of the pen head base 46 include cooperating means for releasably holding the reservoir to the pen head base and permitting the reservoir to be easily connected to and disconnected from the holder 84, with the reservoir when connected with the holder also being connected with the pressurized air supplied to the pen head through the wand tube 60 so that such air is supplied to the air inlet opening 108 in the air inlet end of the reservoir. Various different forms of such releasable connecting means may be employed without departing from the invention. By way of example, in the illustrated case a bayonet type of releasable connection is formed between the reservoir and the reservoir holder. Referring to FIGS. 4, 6, 7 and 9, the air inlet end of the reservoir body 77 has, as viewed in FIG. 4, a downwardly extending projection 114 having a central bore 116 communicating with the air inlet opening 108 and holding an O-ring 118 in an annular recess. The projection 114 further has at its lower end portion two oppositely directed radially extending tabs 120.

Figure 7:
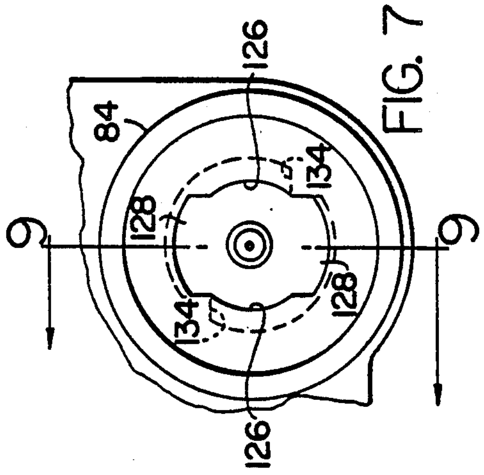
FIG. 7 is a plan view of the reservoir holder of the pen holder base of FIG. 2.

The reservoir holder 84 at its upper end portion has a first cylindrical bore 122 terminating in an upwardly facing annular shoulder 124 providing a base for seating engagement with the lower surface of the reservoir body end wall 105. Extending downwardly from this shoulder 124 are two diametrically opposite arcuate locking portions 126,126 which are of such arcuate extent and so spaced from one another as to define between them two gaps 128 as seen in FIG. 7. Below these locking portions the holder 84 has a second bore 130 of smaller diameter than the bore 122. Extending upwardly from the center of the second bore 130 is an air supply nose 132. Associated with each locking portion 126 is a downwardly extending stop surface 134 which, when a reservoir is in place in the holder, is engageable with an associated one of the reservoir tabs 120 to limit clockwise rotation, as seen in FIG. 7, of the reservoir body.

Figure 6:
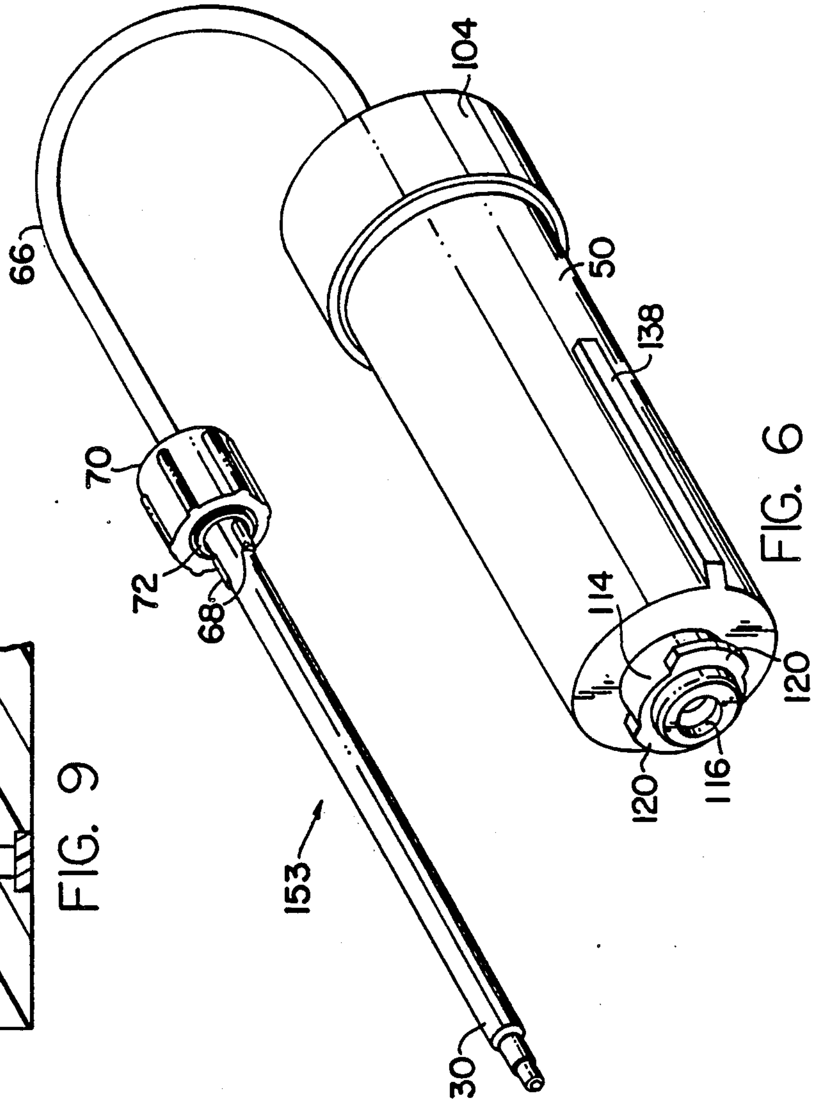
FIG. 6 is a perspective view of the pen and ink reservoir unit of FIG. 4.
Figure 9:
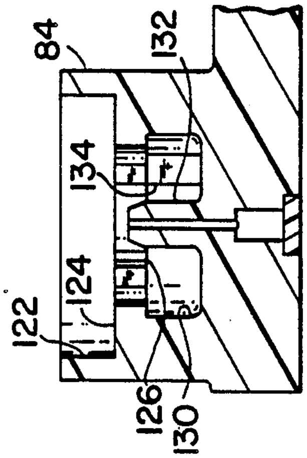
FIG. 9 is a vertical sectional view through the ink reservoir holder taken on the line 9—9 of FIG. 7.
Figure 8:
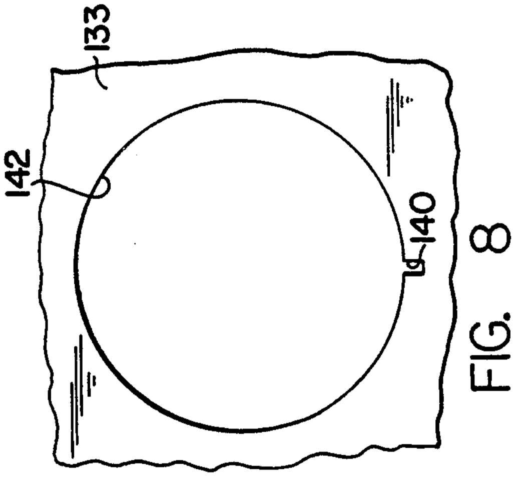
FIG. 8 is a fragmentary plan view of the pen head cover of FIG. 2 shwing the opening for receiving the ink reservoir .

FIGS. 7 and 9 show the reservoir holder 84 with no reservoir in place. To attach a reservoir to the holder the reservoir is moved downwardly into the holder with its air inlet end directed downwardly and in such an angular position about its longitudinal axis that the tabs 120 will pass through the gaps 128 in the holder. To aid in this movement of the reservoir into the holder 84 the reservoir and the pen head cover 133, through which the reservoir passes, preferably include interengaging elements which permit passage of the reservoir through the cover only when the reservoir is properly angularly positioned for the tabs 120 of the reservoir to pass through the gaps 128 of the holder 84. As shown in FIGS. 6 and 8, this means includes a longitudinally extending spline 138 fixed to the outer surface of the reservoir body and a corresponding notch 140 in the cover opening 142 through which the reservoir pases. The length of the spline 138 is such that its top end moves below the cover 132 as the tabs 120 move through the gaps 128 so that the reservoir body may thereafter be rotated without such rotation being hindered by the spline. After the reservoir reaches its fully lowered position, at which its lower end wall engages the shoulder seat 124, the reservoir body is rotated a fractional revolution clockwise, as seen in FIG. 7, to move the tabs 120 below the arcuate locking portions 126 to mechanically lock the reservoir to the holder. Preferably, the interengaging surfaces of the tabs 120 and of the arcuate portions 126 are helically inclined so that as the reservoir is rotated clockwise a wedging actions takes place to tightly fix the reservoir to the holder with over-rotation of the reservoir being prevented by engagement of the tabs 120 with the abutment surfaces 134. Disattachment of the reservoir from the holder takes place in the reverse manner with the reservoir first being rotated counterclockwise and then lifted upwardly from the holder and through the opening 142 in the pen head cover.

When the reservoir is attached to the reservoir holder, as shown in FIG. 4, the air supply nose is received in the central bore 116 of the reservoir and sealed against air leakage by the O-ring 118 so that pressurized air from the nose will floww into the air receiving chamber portion 92 of the reservoir.

As shown in FIG. 5 the air supply tube 60 of the wand 38 is attached to a tubular nipple 144, on the upper end of the post 58, which communicates with an opening 146 in the post itself. This post opening 146 communicates with a slot 148 in the pen head base 46 in turn communicating with a passageway 150 passing centrally through the air supply nose 132. The slot 148 is closed by a plate 152 sonically welded or otherwise sealingly bonded to the base 46. Therefore, the pressurized air supplied by the wand tube 60 flows through the nipple 144, the post opening 146, the slot 148 and the nose passageway 150 to the air inlet opening 108 of the reservoir 50 when the reservoir 50 is in place on the holder 84.

As shown in FIG. 6, the pen 30 and reservoir 50 are preferably permanently connected with one another and with the supply tube 66, pen holder cap 70 and compression spring 72 to form an ink supply unit assembly or module 153 which in its entirety is readily connectable to and disconnectable from the remainder of the pen head 32 to permit quick exchange of such units to substitute a unit with a full supply of ink for one having an exhausted or nearly exhausted supply of ink or to change the color or type of ink used or the type of pen used. That is, the replacement may be made to substitute a pen which draws a width of line different fom the width of line drawn by the current pen. It will be understood that when attaching such a unit 153 to the pen head the reservoir is connected with the pen head base in the manner previously described and that at the same time the pen 30 is attached to the pen holder by sliding the pen tube into the pen holder and then threading the cap 70 onto the upper end of the pen holder body; and during removal of the unit the pen is removed from the pen holder by first unscrewing the cap 70 from the pen holder and by then sliding the pen upwardly out of the holder.

As a further feature of the invention, the ink reservoir, when attached to the pen holder, extends upwardly beyond the upper wall of the pen head cover 133, and the body 77 of the ink reservoir is made of a transparent or translucent material so that after the piston 86 moves upwardly beyond the top wall of the cover 133 both it and the ink remaining in the reservoir are visible from outside of the pen head by the plotter operator. Therefore, by merely observing the ink reservoir the operator obtains an accurate indication of the remaining ink supply and is able to replace the unit assembly 153 with one having a full supply of ink at a convenient time in the operation of the plotter and before the pen 30 fails to draw lines because of ink exhaustion.

Further, the pen head preferably has associated with it a means for automatically producing an electrical "out of ink" signal which appears when the ink does become completely exhausted and which may be used to inhibit further line drawing operation of the plotter.

As previously mentioned, the design of the piston 86 in conjunction with the conical taper 102 provided at the ink discharge end of the cylindrical chamber permits air from the air receiving portion 92 of the chamber to flow past the piston when the piston reaches the ink discharge end of the reservoir. Therefore, after the piston does reach the ink discharge end of the reservoir air flows past it and into the air supply tube 66 to pressurize the ink remaining in the air supply tube 66 and in the pen tube 62 until this remaining ink is completely exhausted from the pen tube. Once this state of complete ink exhaustion is reached the pressurized air in the pen tube leaks past the ball or other ink transferring means at the lower end of the pen. Further, the air pump 44, which supplies the pressurized air, is such that when this leakage occurs it is unable to maintain its output air pressure above a given value as it could before such leakage occurred. As shown in FIG. 5, an air pressure sensor 154 senses the output air pressure of the air pump 44 and produces an electrical "out of ink" signal when that pressure falls below the aforesaid given value. This signal is then used by the plotter controller 137 to inhibit further line drawing operation of the plotter and/or to light a visible "out of ink" indicator forming part of a display 158 associated with the plotter.

As mentioned, the above described construction of the ink reservoir 50 permits such reservoir to receive a precharge of pressurized air before the unit assembly is attached to the pen head. This means that the pen and ink supply units, if desired, can be made and be shipped and stored without the ink in each reservoir being pressurized until receiving a precharge of pressurized air just before the associated unit is attached to the pen head. The delay in pressurizing the ink until just before attachment of a unit to a pen head minimizes the possibility of ink leakage during shipping and storing of the units; and the precharging of pressure into a unit just before attaching it to a pen head makes the ink and pen immediately ready to draw quality lines as soon as the unit is connected to a pen head. In the absence of such a precharge, it may take the pump 44 some time to build up an effective head of air in the air receiving chamber 92, and during that time the ink may not be pressurized to a degree assuring the drawing of quality lines at the plotter's operational speed.

Figure 10:
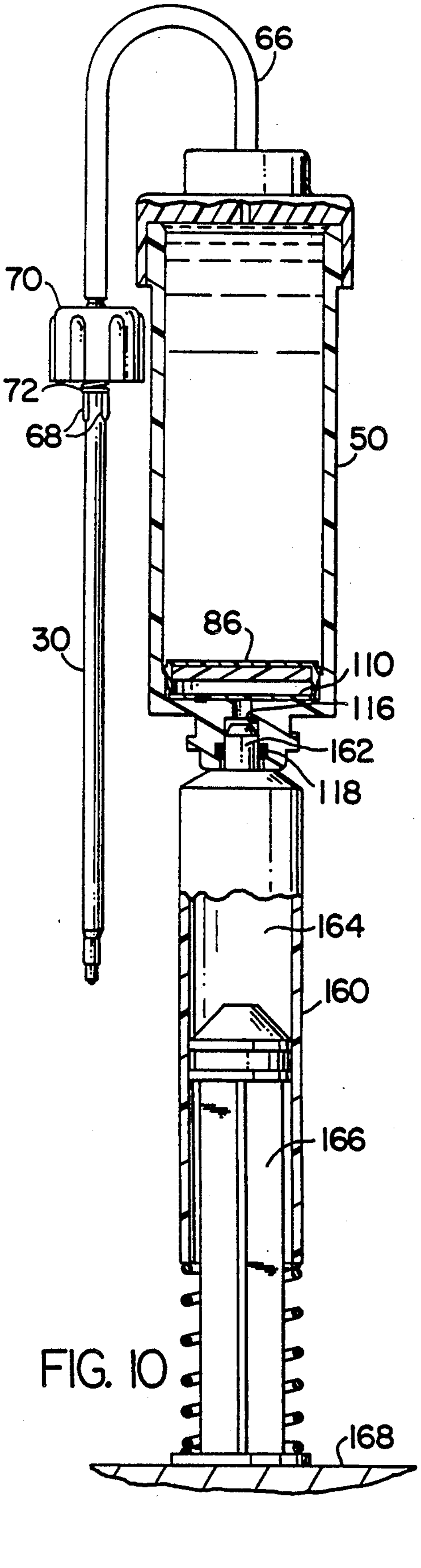
FIG. 10 is a view partly in elevation and partly in section showing the pen and resevoir unit of FIG. 6 connected to an air pump for applying a precharge of pressurized air to the reservoir prior to the unit being connected to a pen head.

The precharge may be applied to an ink reservoir 50 in various different ways, but it is presently preferred to apply such a precharge by using a hand operable syringe type air pump 160 as shown in FIG. 10. This pump has a cylindrical body with an air outlet nose 162 and a cylindrical chamber 164 slideably receiving a piston plunger 166. The pump is preferably so designed that, when used to apply a precharge of air to a fresh ink reservoir 50 completely filled with ink, a single full stroke of the piston plunger 166 is operable to supply the desired amount of precharge to the reservoir. The application of the precharge may therefore take place with the pump 160 and the reservoir 50 connected with one another, as shown in FIG. 10, with the pump's outlet nose 162 received in the central opening 116 of the reservoir body and with the lower end of the piston plunger 166 resting on a supporting surface 168. The operator then pushes downwardly on the reservoir 150 to execute a full compression stroke of the piston plunger 166, thereby in such one stroke applying the desired precharge to the reservoir. The one-way valve 110 of the reservoir retains this precharge in the reservoir so that the reservoir can be disconnected from the pump 160 and subsequently connected to the pen head without its precharge being lost.

Figure 11:
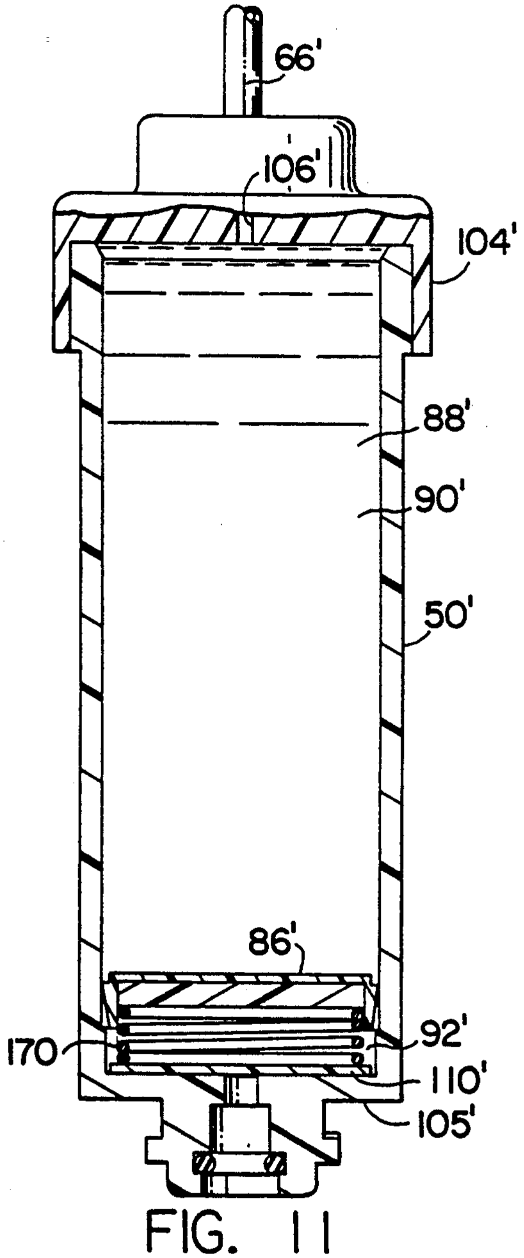
FIG. 11 is a vertical sectional view taken through an ink reservoir comprising another embodiment of the invention.

Instead of providing an initial pressurization of the ink by a precharge of pressurized air, such initial pressurization can also be obtained by arranging a spring in the air receiving portion of the reservoir chamber to spring bias the piston toward the ink discharge end of the reservoir chamber during the initial portion of the piston's movement away from the air inlet end of the chamber. Such a construction of a reservoir is shown in FIG. 11 wherein parts similar to those of FIGS. 1 to 10 have been given the same reference numerals except for being primed. In this construction the air receiving portion 92' of the reservoir chamber 88' receives a helical compression spring 170 which in the full of ink condition of the reservoir, as shown in FIG. 11, is compressed between the piston 86' and the adjacent reservoir end wall 105'. The spring 170 therefore urges the piston 86' upwardly toward the ink discharge end of the reservoir and compresses the ink 90' to pressurize it, thereby eliminating the need for a precharge of pressurized air to achieve such ink pressurization.

In the previously described embodiment of FIGS. 1 to 10, the valve disc 110 has been described as being located near the end wall 105 and having associated with it some means for retaining it near to the end wall 105 when no pressurized air is in the air receiving portion 92 of the chamber, and such means has been shown to be a quantity of adhesive attaching the valve disc at one point to the end wall. Also, in the embodiment of FIGS. 1 to 10, the ink reservoir and piston are such that when the piston reaches the ink discharge end of the cylinder, air may flow past the piston to continue to apply pressure to the ink in the supply tube 66 and in the pen tube 62 until all of the ink is exhausted from the pen tube. In accordance with the broader aspects of the invention, however, various different means may be used for retaining the valve disc 110 near the end wall of the cylinder, and the cylinder and piston may be designed, if desired, to permit no leakage of air past the piston when the piston reaches the air discharge end of the cylinder. An embodiment of the invention employing an alternate valve disc retaining means and providing for no leakage of air past the piston when the piston reaches the air discharge end of the cylinder is shown by FIGS. 12 to 15.

Figure 13:
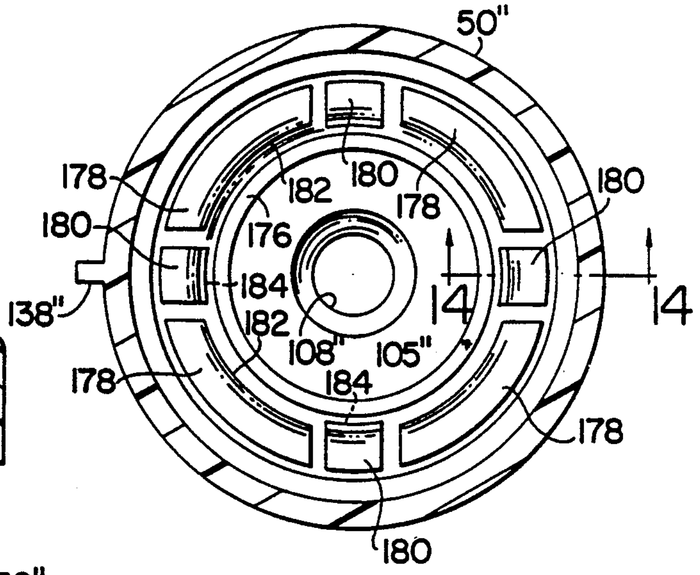
FIG. 13 is a transverse sectional view taken on the line 13—13 of FIG. 12.
Figure 14:
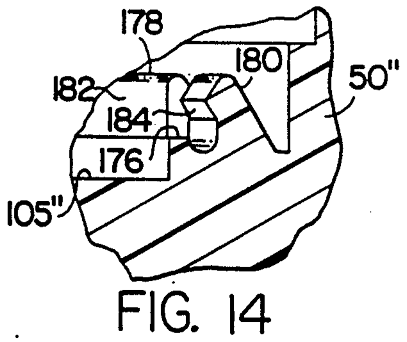
FIG. 14 is a fragmentary vertical sectional view taken on the line 14—14 of FIG. 13.
Figure 15:
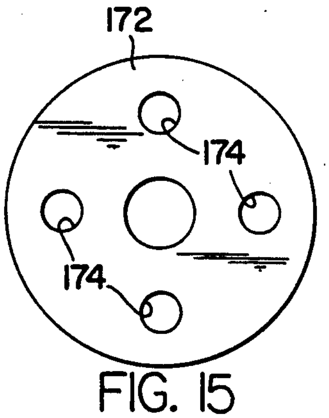
FIG. 15 is a plan view of the retaining disc of the reservoir of FIG. 12.

Referring to FIGS. 12 to 15 the parts there shown which are generally similar to corresponding parts of FIGS. 1 to 10 have been given the same reference numerals as in FIGS. 1 to 10 except for being double primed. The illustrated reservoir 50" at its air discharge end receives a flat disc 110" adapted to flatly seat against the end wall 105". When no pressurized air is in the air receiving portion 92" of the reservoir the valve disc 110" is loose and free to move relative to the end wall 105", but is held near to and generally parallel to the end wall 105" by a retaining disc 172. As shown in FIG. 15, the retaining disc 172 is circular in shape and contains a number of openings 174. The disc 172 rests against an annular seat 176 and is held in placed by a snap-fit connection with the reservoir body.

The means for providing the snap-fit connection between the reservoir body and the retaining disc 172 are best shown in FIGS. 13 and 14. In particular, this means comprises four long arcuate ribs 178 alternating with four shorter snap fingers 180. The arcuate ribs 178 have internal faces 182 extending along a circular line of only slightly larger diameter than that of the retaining disc 172 so that said surfaces 182 receive and hold the retaining disc in a centered condition relative to the reservoir body. On the other hand, the snap fingers 180, on their free ends, have inner extremities 184 extending along a circle of slightly smaller diameter than that of the retaining disc so the free ends of the fingers act to hold the retaining disc axially in place in the reservoir body. Further, the free ends of the fingers have appropriately inclined end faces so that upon insertion of the retaining disc into the reservoir body the snap fingers will be deflected by a wedging action between the retaining disc and the finger end faces to allow passage of the retaining disc to its final position.

Figure 12:
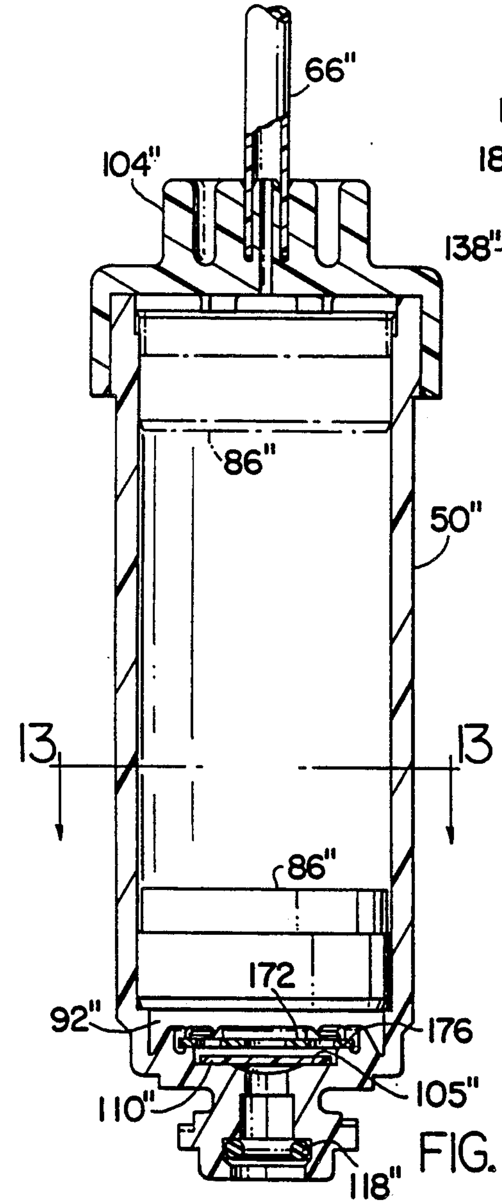
FIG. 12 is a vertical sectional view taken thro gh an ink reservoir comprising another embodiment of the invention.

The reservoir 50" to FIG. 12 also receives a piston 86" having such an axially length and otherwise of such design in relation to the design of the reservoir body than when the piston reaches the air discharge end of the reservoir 50", as shown by the broken lines in FIG. 12, no means are available for the flow of air past the piston to the ink supply tube 66". Therefore, pressurization of the ink ceases after the broken line position of the piston is reached. It is expected, however, that during operation of the plotter the operator will monitor the position of the piston 86" in the reservoir and will change to a new pen and ink supply unit before the piston fully reaches the broken line position of FIG. 12.

We claim:

1. A device for drawing lines on a receiving surface, said device comprising:
   a pen,
   an ink reservoir with an ink discharge end and an air inlet end and a chamber between said discharge and air inlet end,
   a working member axially moveable in said chamber sealingly separating said ink discharge end from said air inlet end,
   means providing an ink flow path for conducting ink from said ink discharge end of said reservoir to said pen, and
   means for applying pressurized air to said chamber through said air inlet end thereof to urge said working member toward said ink discharge end to pressurize whatever ink may be located in said chamber between said working member and said ink discharge end and between said ink discharge end and said pen, said chamber being cylindrical and said working member being a cylindrical piston slidable axially in said chamber, said reservoir being made of a transparent or translucent material so that a position of said piston in said chamber is visibly discernable, said pen and said ink reservoir being part of a pen head including a base and a cover with a generally horizontal top wall located above said base, said ink reservoir being carried by said base with an axis of said cylindrical chamber arranged generally vertically with said ink discharge end being an upper end and with said air inlet end being a lower end, said reservoir further having an upper end portion located above said top wall of said cover and a lower end portion located below said top wall of said cover so that as the ink in said reservoir approaches an empty condition said piston is visible from outside of said pen head to provide a visual indication of an amount of ink remaining in said reservoir.

2. A device for drawing lines on a receiving surface, said device comprising:
   a pen,
   an ink reservoir with an ink discharge end and an air inlet end and a chamber between said discharge and air inlet end,
   a working member axially moveable in said chamber sealingly separating said ink discharge end from said air inlet end,
   means providing an ink flow path for conducting ink from said ink discharge end of said reservoir to said pen, and
   means for applying pressurized air to said chamber through said air inlet end thereof to urge said working member toward said ink discharge end to pressurize whatever ink may be located in said chamber between said working member and said ink discharge end and between said ink discharge end and said pen,
   said pen and said ink reservoir being part of a pen head having a base, said pen including a pen tube having a lower end carrying a means for transferring ink from an interior of said pen tube to a receiving surface and an upper end for receiving ink which flows through said pen tube to said ink transferring means, said pen head also including a pen holder supported by said base for releasably holding said pen in assembly with said pen holder in a substantially vertical condition, said pen head also including means for releasably connecting said ink reservoir to said base, and said means providing an ink flow path from said ink discharge end of said reservoir to said pen being a supply tube extending from said ink discharge end of said reservoir to said upper end of said pen tube, said supply tube being permanently connected to both said discharge end of said reservoir and said upper end of said pen tube so as to form an ink supply unit assembly of said reservoir and said supply tube and said pen which unit assembly through operation of the releasable means connecting said pen to said pen holder and said reservoir to said base may be easily removed from said pen head and replaced by a new similar unit assembly.

3. A device defined in claim 2 further characterized by said base of said pen head including a passageway connected to a source of pressurized air, and said means for releasably connecting said reservoir to said base including means for connecting and disconnecting said air inlet end of said reservoir to and from said passageway as said reservoir is releasably connected and disconnected to and from said base.

4. The device defined in claim 3 further characterized by a one-way valve located between said inlet end of said reservoir and said chamber to allow pressurized air to enter said chamber through said air inlet end and to prevent reverse flow of pressurized air from said chamber through said air inlet end.

5. The device defined in claim 4 wherein said reservoir has an end wall closing said cylindrical chamber at said air inlet end thereof and said end wall includes a central opening for the flow of pressurized air into said chamber, said one-way valve comprising a disc of flexible material attached at one point to an inboard side of said wall and overlying said central opening.

6. The device defined in claim 3 further characterized by said pen head being part of an X,Y plotter, means providing a support surface for supporting paper providing said receiving surface to be drawn on by said pen, means supporting a supply roll and a take-up roll for said paper so that said paper moves from said supply roll over said support surface to said take-up roll, and a drive motor for driving said take-up roll to advance paper over said support surface, said source of pressurized air being an air pump driven by said take-up roll drive motor so that said pump is operated whenever said drive motor drives said take-up roll to advance paper over said support surface.

7. The device defined in claim 3 further characterized by said chamber being cylindrical and said working member being a cylindrical piston slidable axially in said chamber, said source of pressurized air being an air pump, said ink reservoir adjacent said ink discharge end thereof having means allowing air from said inlet end to pass around said piston to said ink discharge end when said piston is located immediately adjacent said ink discharge end so that said pressurized air can reach and apply pressure to the ink in said supply tube and pen tube until all of the ink is exhausted from said pen tube after which air will leak from said pen by flowing past said ink transferring means, said air pump being such that after air starts to leak past said ink transferring means of said pen, said pump cannot maintain an output air pressure above a given value maintained before such leakage occurs, means for sensing the output air pressure of said pump, and means for providing an "out of ink" signal when said sensed output air pressure falls below said given value.

8. The device defined in claim 7 further characterized by means for inhibiting further line drawing operation of said plotter upon the appearance of said "out of ink" signal.

9. The device defined in claim 2 further characterized by said means for releasably connecting said pen to said pen holder including a cap releasably connectable to the upper end of said pen holder, said cap having a central opening through which said ink supply tube loosely passes, said pen tube having a radially extending abutment located at one point along a length of said tube, and a helical compression spring surrounding said pen tube and/or said supply tube and located between said abutment and said cap, which spring when said cap is releasably connected to said upper end of said pen holder is compressed between said abutment and said cap to resiliently urge said pen tube downwardly relative to said holder.

10. The device defined in claim 2 further characterized by said pen head further including a solenoid for vertically moving said pen holder between writing and nonwriting positions.

11. The device defined in claim 2 further characterized by said means for releasably connecting said reservoir to said pen head base being interengagable elements on said pen head base and on said reservoir forming a bayonet connection whereby said reservoir may be connected to said base by first moving said reservoir downwardly relative to said base until reaching a given lowered position and by then rotating said reservoir relative to the base about a vertical axis by a fraction of a revolution to a connected condition.

12. The device defined in claim 11 further characterized by said pen head having a cover with a top wall located above said base, said top wall having an opening for receiving said ink reservoir as said reservoir is moved from a disconnected condition to a connected condition with said pen head base, said ink reservoir when in a connected condition with said base having an upper portion extending upwardly beyond said top wall of said cover, said cover and said ink reservoir having at least one set of interengageable elements which allow said reservoir to be inserted through said opening only with said reservoir at such an angular position relative to said base as will bring said interengageable elements of said base and reservoir into proper position with one another when said reservoir reaches a lowered position relative to said base as to allow such reservoir to be thereafter merely rotated to bring the ink reservoir and base into said connected condition.

13. The device defined by claim 2 further characterized by a hand pump having an air outlet end readily connectable to said air inlet end of said reservoir to apply a precharge of pressurized air to said reservoir prior to said reservoir being connected with said pen head base.

14. The device defined in claim 2 further characterized by said chamber being cylindrical and said working member being a piston axially slidable in said chamber, and a spring located between said piston and said air inlet end of said chamber for urging said piston toward said ink discharge end during an initial portion of the movement of said piston from said air inlet end of said chamber toward said ink discharge end of said chamber.

15. An ink supply unit assembly for use with a device for drawing lines on a receiving surface and which unit assembly when empty of ink or when a different type of ink or pen is wanted is removable as a unit from said device and is replaceable by a similar unit assembly full of ink or containing a different type of ink or pen, said unit assembly comprising:

a pen having a pen tube with an ink transferring means at one end and with an open opposite end, an ink reservoir with an ink discharge end and air inlet end and a chamber between said discharge and air inlet end, a working member axially moveable in said chamber and sealingly separating said ink discharge end from said air inlet end to divide said chamber into an ink receiving portion communicating with said ink discharge end and an air receiving portion communicating with said air inlet end, a supply tube fixed to said pen tube and to said ink reservoir and extending from said ink discharge end of said reservoir to said opposite end of said pen tube, and a quantity of ink in said ink receiving portion of said reservoir and in said pen tube and supply tube.

16. A unit assembly as defined in claim 15 further characterized by said chamber being cylindrical and said working member being a piston axially slidable in said chamber.

17. A unit assembly as defined in claim 15 further characterized by said ink reservoir having an air supply opening at said air inlet end thereof, and a one-way valve associated with said air supply opening permitting air flow through said air supply opening to said air receiving portion of said chamber and preventing air flow in the reverse direction.

18. A unit assembly as defined in claim 17 further characterized by said reservoir having an end wall at said air inlet end thereof through which said air inlet opening communicates, said one way valve being a valve disc located adjacent said end wall and overlying said air supply opening, and means for maintaining said valve disc positioned near to said end wall.

19. A unit assembly as defined in claim 18 further characterized by said means for maintaining said valve disc positioned near said end wall being a retaining disc spaced axially of said reservoir from said end wall with said valve disc being loosely received between said retaining disc and said end wall, and means forming a snap-fit connection between said retaining disc and said reservoir for holding said retaining disc in a generally axially fixed position relative to said reservoir.

20. A unit assembly as defined in claim 15 further characterized by said pen being adapted for reception by a generally tubular pen holder having an upper end through which said pen is inserted, said pen tube having a radially extending abutment located at a given point between said tube ends, a cap loosely received on said pen tube and/or supply tube between said abutment and said discharge end of said reservoir and adapted for releasable connection to said upper end of said pen holder, and a helical compression spring located on said pen tube and/or supply tube between said abutment and said cap for resiliently urging said pen tube downwardly relative to said holder after said cap is releasably connected to a pen holder.

21. A unit assembly as defined in claim 20 further characterized by said ink reservoir at said air inlet end thereof having means cooperable with mating means of an ink reservoir holder for mechanically connecting said reservoir to said reservoir holder and for connecting said air inlet end thereof to a source of pressurized air.

22. A method of assembling and operating an apparatus for drawing on a receiving surface, said method comprising the step of:

providing a receiving surface, providing a pen head with a base carrying a pen holder and an ink reservoir holder, providing an ink supply unit assembly consisting of a pen and an ink reservoir and a tube fixed to both said pen and said ink reservoir for conducting ink from said ink reservoir to said pen, said ink reservoir having an ink discharge end and an air inlet end and a chamber between said two ends, and a working member axially moveable in said chamber and sealingly separating said ink discharge end from said air inlet end and dividing said chamber into an ink receiving portion and an air receiving portion, there being a quantity of ink in said ink receiving portion of said chamber and in said pen tube and supply tube, said ink reservoir also having a one-way valve between said air inlet end and said air receiving portion of said chamber so as to permit pressurized air to be introduced to said air receiving portion while preventing reverse flow of pressurized air from said air receiving portion, applying a pre-charge of a pressurized air to said air receiving portion of said chamber, connecting said unit assembly to said pen head by releasably attaching said pen to said pen holder and releasably attaching said reservoir to said reservoir holder, and thereafter moving said pen head and receiving surface relative to one another with said pen in engagement with said receiving surface to draw lines thereon and applying further pressurized air to said air receiving portion of said chamber through said air inlet end of said reservoir.

23. The method defined in claim 22 further characterized by said chamber being cylindrical and said working member being a piston axially slidable in said chamber.

24. A method of assembling and operating an apparatus for drawing on a receiving surface, said method comprising the steps of:

providing a receiving surface, providing a pen head with a base carrying a pen holder and an ink reservoir holder, providing an ink supply unit assembly consisting of a pen and an ink reservoir and a tube fixed to both said pen and said reservoir for conducting ink from said ink reservoir to said pen, said ink reservoir having an ink discharge end and an air inlet end and a chamber between said two ends, and a working member axially moveable in said chamber and sealingly separating said ink discharge end from said air inlet end and dividing said chamber into an ink receiving portion and an air receiving portion, there being a quantity of ink in said ink receiving portion of said chamber and in said pen tube and supply tube, a spring in said air receiving portion of said chamber for urging said working member toward said ink discharge end of said reservoir during an initial portion of said member its movement toward said ink discharge end to initially pressurize the ink in said ink receiving portion of said chamber and in said ink supply tube and pen, connecting said unit assembly to said pen head by releasably attaching said pen to said pen holder and releasably attaching said reservoir to said reservoir holder, and thereafter moving said pen head and receiving surface relative to one another with said pen in engagement with said receiving surface to draw lines thereon and applying pressurized air to said air receiving portion of said chamber through said air inlet end of said reservoir.

25. The method defined in claim 24 further characterized by said chamber being cylindrical and said working member being a piston slidable in said chamber.

* * * * *

UNITED STATES PATENT AND TRADEMARK OFFICE
CERTIFICATE OF CORRECTION

PATENT NO. : 5,101,219 Page 1 of 2

DATED : March 31, 1992

INVENTOR(S) : Heinz J. Gerber and Andrew G. Bakoledis

It is certified that error appears in the above-identified patent and that said Letters Patent is hereby corrected as shown below:

Column 1

Line 24, delete "pressureized" and substitute--pressurized--.
Line 67, delete "item" and substitute--time--.

Column 2

Line 10, after "in" insert--a--.
Line 40, delete "reachs" and substitute--reaches--.
Line 40, delete "exhaused" and substitute--exhausted--.

Column 3

Line 8, delete "FFIG." and substitute--FIG.--.
Line 25, delete "shwing" and substitute--showing--.
Line 30, delete "resevoir" and substitute--reservoir--.
Line 37, delete "thro gh" and substitute--through--.

Column 5

Line 2, delete "anbd" and substitute--and--.
Line 62, delete "in" and substitute--ink--.
Line 68, delete "slibable" and substitute--slidable--.

Column 6

Line 22, delete "," and substitute--;--.
Line 32, delete "downward" and substitute--downwardly--.

UNITED STATES PATENT AND TRADEMARK OFFICE

CERTIFICATE OF CORRECTION

PATENT NO. : 5,101,219

DATED : March 31, 1992

INVENTOR(S) : Heinz J. Gerber and Andrew G. Bakoledis

It is certified that error appears in the above-identified patent and that said Letters Patent is hereby corrected as shown below:

Column 7

Line 3, delete "thee" and substitute--the--.

Column 8

Line 3, delete "pases" and substitute--passes--.
Line 29, delete "floww" and substitute--flow--.
Line 58, delete "fom" and substitute--from--.

Column 11

Line 36, delete "to" and substitute--of--.
Line 39, delete "than" and substitute--that--.

Signed and Sealed this

Fifteenth Day of June, 1993

Attest:

Michael K. Kirk

MICHAEL K. KIRK

*Attesting Officer* *Acting Commissioner of Patents and Trademarks*